United States Patent [19]

Geeck, III

[11] Patent Number: 4,696,150
[45] Date of Patent: Sep. 29, 1987

[54] POWER MOWER WITH BLADE-BRAKE CLUTCH

[76] Inventor: Joseph S. Geeck, III, 6355 Jefferson Hwy., Harahan, La. 70123

[21] Appl. No.: 371,235

[22] Filed: Apr. 23, 1982

[51] Int. Cl.[4] ............................................. A01D 69/10
[52] U.S. Cl. .................................... 56/11.3; 56/17.5; 56/11.7; 188/77 R; 192/0.094
[58] Field of Search ...................... 56/10.5, 11.2, 11.3, 56/11.8, 11.7; 192/0.094, 0.082, 11; 267/136, 140.1, 140.3, 140.4, 141, 153; 188/77 R

[56] References Cited

U.S. PATENT DOCUMENTS

| | | | |
|---|---|---|---|
| 1,936,389 | 11/1933 | Hallquist | 267/140.4 |
| 2,523,171 | 9/1950 | Willey | 56/DIG. 16 |
| 2,566,164 | 8/1951 | Callison | 56/DIG. 18 |
| 2,697,904 | 12/1954 | Goudie | 56/11.6 |
| 2,838,267 | 6/1958 | Wells | 267/140.1 |
| 2,855,742 | 10/1958 | Cooper et al. | 56/11.6 |
| 2,857,726 | 10/1958 | Smith | 56/11.6 |
| 2,875,870 | 3/1959 | Mesrobian | 192/0.094 |
| 2,957,561 | 10/1980 | Musgrave | 192/11 |
| 3,367,459 | 2/1968 | Rubin | 492/11 |
| 3,474,487 | 10/1969 | Resag et al. | 188/77 R |
| 3,570,637 | 3/1971 | Pitman et al. | 192/11 |
| 3,583,531 | 6/1971 | Besoyan | 188/77 R |
| 3,658,159 | 4/1972 | Mallinger | 188/77 R |
| 3,764,156 | 10/1973 | Nepper et al. | 280/47.37 |
| 4,022,180 | 5/1977 | Bosma | 56/10.5 |
| 4,033,098 | 7/1977 | Green | 56/DIG. 16 |
| 4,058,957 | 11/1977 | Roseberry | 192/11 |
| 4,090,345 | 5/1978 | Harkness | 56/10.5 |
| 4,148,173 | 4/1979 | Hoff | 56/11.3 |
| 4,152,884 | 5/1979 | Gandrud et al. | 56/202 |
| 4,195,466 | 4/1980 | Heismann | 56/10.5 |
| 4,213,288 | 7/1980 | Takeuchi et al. | 56/11.6 |
| 4,309,862 | 1/1982 | Carlson | 56/11.3 |

*Primary Examiner*—Robert Peshock
*Assistant Examiner*—John G. Weiss
*Attorney, Agent, or Firm*—John F. Sieberth

[57] ABSTRACT

Improvements are described for power mowers comprising a prime mover, a rotatable drive shaft driven by the prime mover and rotatable grass cutting means adapted to be driven by power from said drife shaft. The improvements involve including in the mowers (a) a centrifugal clutch interposed between the drive shaft and the cutting means, (b) apparatus enabling the prime mover to operate at a rate of speed at least high enough for the clutch to engage, and alternatively at a rate of speed low enough for the clutch to disengage, and apparatus including a pulley and at least one stationary belt frictionally engageable therewith for stopping rotation of the cutting means concurrently with the disengagement of the clutch.

4 Claims, 7 Drawing Figures

POWER MOWER WITH BLADE-BRAKE CLUTCH

TECHNICAL FIELD

This invention relates to power equipment of enhanced safety during use. More particularly, this invention relates to power mowers having a unique, simple and highly-effective bladebrake clutch system.

BACKGROUND

For decades the power equipment industry has been working on ways of reducing the hazards associated with power mowers and other like equipment having blades which operate at high speeds. Despite this effort, the Consumer Products Safety Commission has found it necessary to require that all walk behind lawn mowers manufactured after June 30, 1982 be designed so that the mower blade will stop within three seconds after the operator's hands have been removed from the handle. To accomplish this, there are two general approaches that may be used. One involves stopping the engine by means of an automatic switch or the like which is activated upon release of the handle. While effective, this approach is troublesome and wasteful as it necessitates frequent re-starting of the engine.

The other approach, which involves use of a brake and clutch system which will stop the blade and yet allow the engine to keep running, is a more desirable way to proceed. However, in practice it has been found very difficult to devise a system which is simple, inexpensive and highly effective.

SUMMARY OF THE INVENTION

My prior copending application Ser. No. 358,656 filed Mar. 16, 1982, all disclosure of which is incorporated herein by reference, describes a simple, inexpensive and highly-effective blade-brake and clutch system based in part on use of a pulley and a stationary belt for stopping rotation of the cutting means such as the rotary blades of a walk behind lawn mower. More particularly, in a power mower comprising a prime mover, rotatable grass cutting means, and power transmission means operatively connecting the prime mover with the rotatable grass cutting means to cause rotation of the cutting means, the system described in said copending application involves the improvement wherein the mower further includes (a) means for disconnecting the transmission means, and (b) means including a pulley and a stationary belt for stopping rotation of the cutting means concurrently with the disconnection of the power transmission means.

In one of its basic embodiments, the present invention involves this same system with the qualification that a centrifugal clutch is used as the means for connecting and disconnecting the prime mover with and from the rotatable grass cutting means. In short, pursuant to this embodiment there is provided in a power mower comprising a prime mover and rotatable grass cutting means adapted to be driven by power from said prime mover, the improvement wherein said mower further includes:
(a) a centrifugal clutch interposed between the prime mover and the rotatable grass cutting means, and
(b) means including a pulley and a stationary belt frictionally engageable therewith for stopping rotation of said rotatable grass cutting means.

Preferably the apparatus further includes actuatable means releasing said belt from frictional engagement with said pulley in response to actuation of said actuatable means by the operator. In a further preferred embodiment this apparatus also includes means causing said belt to be brought into frictional engagement with said pulley when actuation of said actuatable means by the operator is terminated.

In a more particular embodiment, this invention provides in a power mower comprising a prime mover, a rotatable drive shaft driven by the prime mover and rotatable grass cutting means adapted to be driven by power from said drive shaft, the improvement wherein said mower further includes:
(a) a centrifugal clutch interposed between said drive shaft and said cutting means,
(b) means enabling the prime mover to operate at a rate of speed at least high enough for said clutch to engage, and alternatively at a rate of speed at least low enough for said clutch to disengage, and
(c) means including a pulley and at least one stationary belt frictionally engageable therewith for stopping rotation of said rotatable grass cutting means concurrently with the disengagement of said clutch.

Although the pulley and stationary belt system employed in these various embodiments may be utilized in various ways, as for example by attaching the pulley to the shaft carrying the cutting blades or to another rotatable member connected to such shaft by means of gears or the like, it is preferable to use the pulley and belt system for stopping rotation of the downstream portion of the centrifugal clutch, preferably by positioning the pulley around the perimeter of the centrifugal clutch. Thus the pulley can be and preferably is integral with the rotatable drum or hub of the centrifugal clutch. Likewise, it is preferable to secure the grass cutting blades to the downstream portion (e.g., the rotatable drum or hub) of the centrifugal clutch, although other arrangements are possible and feasible.

While other configurations are operative, best results are achieved when the stationary belt is of a V-belt configuration (i.e., it has a frustoconical or wedge-shaped cross-section) and the pulley is configured to accommodate the V-belt. The V-belt should be made of a strong, tough, abrasion-resistant flexible, yet relatively inelastic material. Belts of the type commonly used as automotive fan belts are suitable for this purpose. The pulley itself may be a single rimmed pulley used in combination with one belt, although of course even greater traction may be achieved by use of a double rimmed pulley accommodating a pair of adjacently-positioned belts.

In another of its basic embodiments, this invention provides a power mower in which the cutting blades are caused to rotate only when the operator is actuating a handle, lever, hand bar, trigger, foot pedal or like device. When the operator releases the handle or like device the cutting blades are quickly stopped. Consequently, the operator cannot move away from the mower with the cutting blades remaining in operation. Furthermore if it becomes necessary to suddenly stop the cutting blades, this can be accomplished by simply releasing the handle or like device—the cutting blades are automatically stopped (they can be stopped within three seconds or less) and concurrently the engine is automatically throttled down to a low speed (e.g., idle) operation thereby saving fuel. By again actuating the handle or like device, the operator causes the mower to automatically resume operation in its normal operating speed range. In accordance with this basic embodiment of the invention, the power mower includes (a) a centrifugal clutch interposed between the drive shaft and the cutting means;

(b) means actuatable by the operator enabling the engine (preferably but not necessarily a spark ignition internal combustion engine) upon and during such actuation to operate at a predetermined rate of speed at least high enough for the centrifugal clutch to engage, and causing the engine upon termination of such actuation to operate at a predetermined rate of speed at least low enough for the centrifugal clutch to disengage; and (c) means stopping rotation of the cutting means concurrently with the termination of such actution.

The means of (c) should and most preferably do include a pulley and a stationary belt of the types described above although it is contemplated that other blade braking systems may be employed in this embodiment of the invention. In any event, it will be noted that the rotation of the cutting means is stopped concurrently with the disengagement of the centrifugal clutch and that both of these events are caused by the operator releasing a handle, lever, pedal or like actuating member. It will also be noted that although decidedly less preferable, it is possible pursuant to a variant of this embodiment to design the means of (b) so that they will completely stop the engine when the operator releases the handle, lever, pedal or like actuating member.

Preferably the power mower is a walk behind rotary lawn mower, but the principles of this invention can be applied equally well to rider type mowers and in fact to a wide variety of power tools in which it is desired to quickly stop rotating blades or the like without stopping the prime mover itself.

A particularly preferred walk behind power mower of this invention comprises:

(a) a wheeled body;

(b) a spark ignition internal combustion engine mounted on said body;

(c) an upstanding handle secured to the mower and enabling the operator to guide said power mower;

(d) manually actuatable means positioned on the upper portion of said handle of (c);

(e) a generally vertical rotary shaft driven by the engine of (b);

(f) a centrifugal clutch secured on its upstream side to said rotary shaft of (e);

(g) rotary cutting blades secured to the downstream side of said centrifugal clutch of (f);

(h) a lever member pivotally secured to the underside of said wheeled body of (a), said member extending from its point of rotation in at least two angularly displaced horizontal directions;

(i) a governor system comprising a pivotal governor arm linked to a carburetor throttle control and to a governor spring normally tending to move said arm to a first position wherein the carburetor throttle control is at a setting causing the engine of (b) to operate in a preselected normal speed range in which the centrifugal clutch of (f) is engaged and the cutting blades of (g) are rotated;

(j) a pivotal lever pivotally mounted intermediate its length and positioned in proximity to said pivotal governor arm of (i) so that a first end portion of said lever is adapted to move forwardly or backwardly in contact with said pivotal governor arm;

(k) a first push-pull cable secured at one end to said lever member of (h) at a first locus removed from said point of rotation of (h) and at its other end to the second end portion of said pivotal lever of (j);

(l) a second push-pull cable secured at one end to said manually actuatable means of (d) and at its other end to said lever member of (h) at a second locus which is (A) in proximity to said first locus of (k) and (B) removed from said point of rotation of (h);

(m) a pulley secured to the downstream side of said centrifugal clutch of (f);

(n) a brace secured to said lever member of (h) at a locus which is (A) angularly displaced from said first locus of (k) and said second locus of (l), and (B) removed from said point of rotation of (h);

(o) at least one belt tightly secured to said brace of (n) and positioned to be frictionally engaged with said pulley of (m) to stop rotation thereof, and alternatively to be loosened from said pulley so that the pulley is free to rotate; and (p) a spring attached at one end to the underside of said wheeled body of (a) and at its other end to said lever member of (h), said spring normally tending to move said lever member to a first position wherein said brace of (n) frictionally engages said belt of (o) with said pulley of (m) and stops rotation thereof;

said mower being further characterized in that:

(1) upon and during actuation of said manually actuatable means of (d) said second push-pull cable of (l) rotates and holds said lever member of (h) in a second position wherein:

said brace of (n) loosens said belt of (o) from said pulley of (m), and concurrently said first push-pull cable of (k) pushes the second end portion of said pivotal lever of (j) to which it is secured thereby causing the first end portion of said lever to move backwardly relative to said pivotal governor arm of (i) so that said governor spring of (i) moves said arm to said first position of (i) whereby the engine of (b) operates in said preselected normal operating speed range in which the centrifugal clutch of (f) is engaged and the cutting blades of (g) are rotated; and (2) upon termination of actuation of said manually actuatable means of (d) said spring of (p) moves said lever member of (h) to said first position wherein:

said first push-pull cable of (k) pulls the second end portion of said pivotal lever of (j) to which it is secured thereby forcing the first end portion of said lever to move forwardly relative to said pivotal governor arm of (i) so that said arm is forced to a second position wherein the carburetor throttle control of (i) is moved to a setting in which the engine of (b) is caused to operate in a preselected low speed or idle range in which the centrifugal clutch of (f) is disengaged; and concurrently said brace of (n) engages said belt of (o) with said pulley of (m) and stops rotation of said pulley and the cutting blades of (g).

It has been found desirable in actual practice to damp the governor spring against excessive vibrational motion and excessively rapid contraction during operation of the mower. Thus still another embodiment of this invention involves a spring adapted for use as a governor spring comprising a coil spring having its interior annular space filled with a plug of a compressible elastomeric substance so that the spring is damped against vibrational motion. Preferably the elastomeric substance is a foamed rubber.

These and other embodiments and features of the invention will become still further apparent from a consideration of the ensuing description, appended claims, and accompanying drawings.

DESCRIPTION OF PREFERRED EMBODIMENTS

Figure 1:
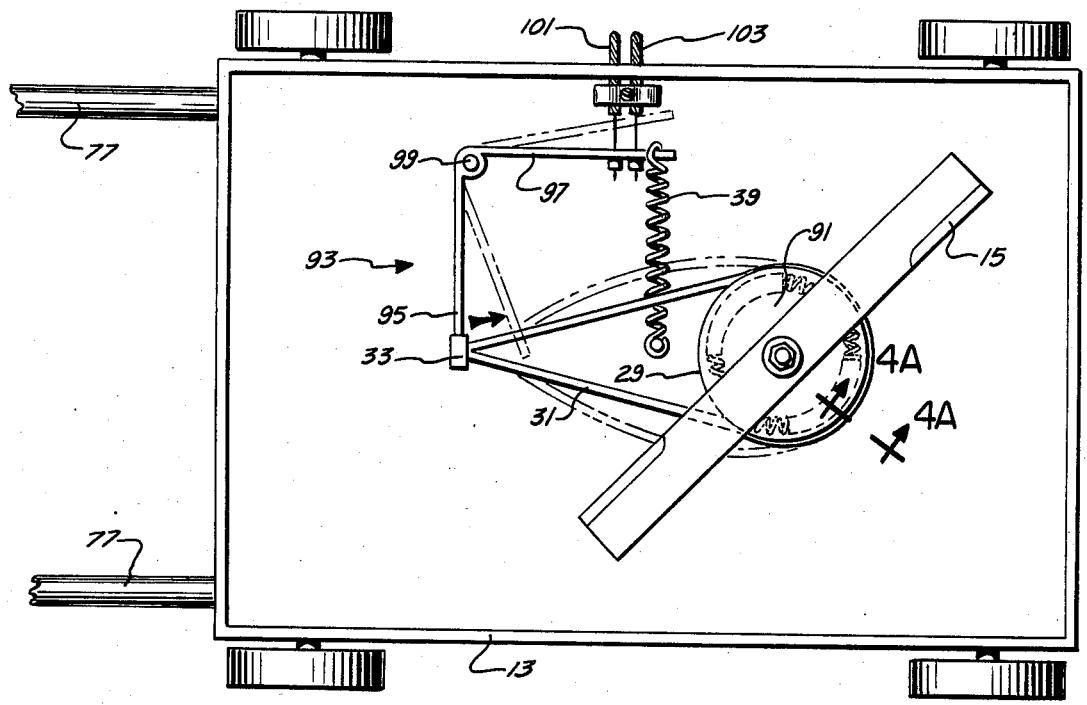
FIG. 1 is a plan view of the underside of a walk behind power mower illustrating a preferred blade-brake system of this invention.

Referring now to the drawings wherein like parts are identified by like numerals, walk behind power mowers in the form depicted comprise a wheeled body 13, an upwardly and rearwardly extending handle 77 secured to the body, rotary cutter blades 15 carried under the body, and a spark ignition internal combustion engine (not fully shown) mounted on the upper surface of the body. The engine includes a standard engine speed regulating sub-assembly (note FIG. 3) comprising governor blade or arm 81 pivotally mounted on the engine and linked to carburetor throttle control 83 by means of speed control rod 85 and to speed control lever 87 by means of governor spring 89. In conventional practice the governor arm is caused to pivot in response to changes in internal air pressure resulting from changes in engine speed and thus by being linked to the carburetor throttle control 83 and speed control lever 87, the speed at which the engine will operate can be readily controlled and adjusted.

Figure 4A:
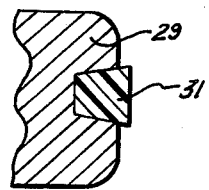
FIG. 4A is a fragmentary sectional view of a single pulley and stationary belt frictionally engageable therewith used in accordance with preferred embodiments of this invention.
Figure 4B:
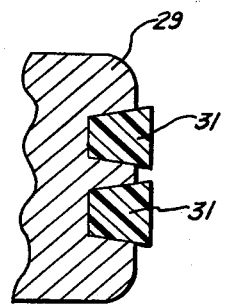
FIG. 4B is a fragmentary sectional view of a double pulley and a pair of stationary belts frictionally engageable therewith used in accordance with preferred embodiments of this invention.

Pursuant to the improvements of this invention cutter blades 15 are mounted on and secured to the downstream portion of centrifugal clutch 91 which, in the form shown, has around its perimeter a stop pulley 29 which accommodates stationary belt 31. As indicated by FIGS. 4A and 4B the pulley may be a single pulley accommodating a single belt or a double pulley equipped with two matching belts. In either case, the belt is most preferably of a V-belt configuration corresponding to the configuration of the rim of pulley 29. In the embodiment depicted in FIG. 1 stationary belt 31 is solidly secured to arm or brace 33 which extends downwardly from lever member indicated generally by the numeral 93 which in turn is composed of a pair of angularly disposed arms 95 and 97. Lever member 93 is pivotally secured to the underside of body 13 by means of shaft 99. Spring 39 is secured at one end to arm 97 and at its other end to the underside of body 13. It will thus be seen from FIG. 1 that lever member 93 is normally held by the tension exerted on arm 97 by spring 39 in a position wherein arm 95 and brace 33 tighten stationary belt 31 on stop pulley 29. It will also be seen from FIG. 1 that lever member 93 can be caused to rotate to a position (shown by phantom lines) wherein stationary belt 31 is loosened from stop pulley 29 so that the pulley and the downstream portion (e.g., the hub and the drum) of centrifugal clutch 91 are free to rotate. To rotate lever member 93 in this manner it is necessary to apply a pulling force to arm 97 in excess of the tension or force applied thereto by spring 39. When such pulling force is terminated, spring 39 causes lever member 93 to return to its normal position wherein stationary belt 31 is tightened on (frictionally engages) pulley 29.

Figure 2:
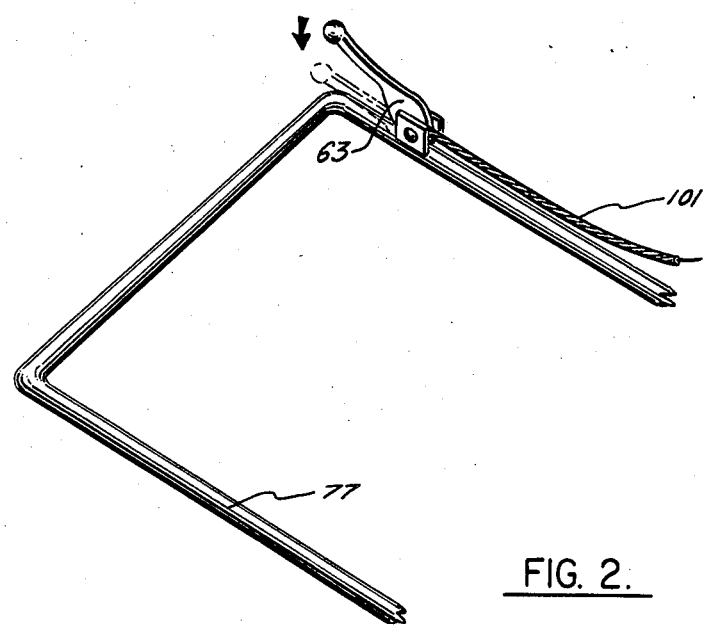
FIG. 2 is a fragmentary view in perspective of the upper portion of the handle of the mower of FIG. 1 illustrating one type of manually actuatable means which may be employed to afford the operational safety features referred to above.

Secured to arm 97 of lever member member 93 is push-pull cable 101, the other end of which is attached to hand lever 63 mounted on the upper portion of handle 77 so that it can be manually depressed by the operator (as indicated by the arrow in FIG. 2). By depressing (actuating) lever 63, cable 101 applies a pulling force on arm 97 overcoming the force of spring 39 so that lever member 93 is rotated into the position shown by phantom lines in FIG. 1 whereby stationary belt 31 is loosened from pulley 29. When the operator releases (stops actuating) lever 63, the tension from spring 39 returns lever member 93 to its original position whereby belt 31 is tightened on pulley 29.

Figure 3:
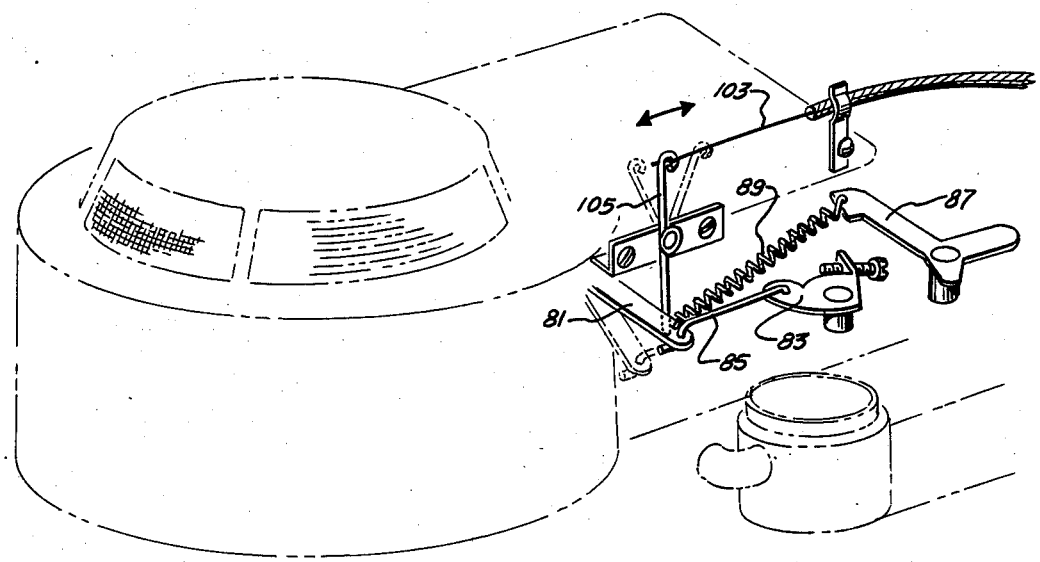
FIG. 3 is a partly schematic view in perspective of a typical engine speed regulating sub-assembly of this invention as applied to a mower driven by a typical spark ignition internal combustion engine.

Also secured to arm 97 of lever member 93 is push-pull cable 103, the other end of which is secured to pivotal lever 105 mounted intermediate its length so that the lower portion of lever 105 impinges upon governor arm 81 (note FIG. 3). Thus a pull on cable 103 (movement to the right in FIG. 3) causes the lower portion of lever 105 to force governor arm 81 to a position shown by phantom lines in FIG. 3. This in turn causes carburetor throttle control 83 to be rotated into a position where the engine operates at a preselected low speed (e.g., idle) at which the centrifugal clutch 91 is disengaged. On the other hand when cable 103 pushes against lever 105, governor arm 81 is returned by the tension of governor spring 89 to the position from whence it came prior to the pull having been applied to cable 103. This movement of arm 81 in turn causes throttle control 83 to be returned to its original setting by means of rod 85. Consequently, the engine resumes operation in its normal operating speed range which is at least high enough to cause centrifugal clutch 91 to engage.

In this connection and as is well known to those skilled in the art, centrifugal clutches are basically composed on the upstream side of weights carried on a rotatable member. These weights are normally held in retracted position by springs. However, when the speed of rotation reaches the level where the centrifugal force of the weights overcomes the retracting forces of the springs, the weights extend and become engaged with the downstream portion of the clutch usually composed of a rotatable drum—the interior of which constitutes the locus of engagement with the weights—and a rotatable hub secured to the exterior of the drum. On the other hand when the rotation speed of the weights is diminished to the extent that their centrifugal force is exceeded by the force of the springs, the weights are retracted and thereby disengage from the interior of the drum. Many centrifugal clutches suitable for use in accordance with this invention are available in the marketplace, for example the "Max-Torque Clutch" supplied by the Max-Torque Company, 7300 North Monticello Avenue, Skokie, Ill. Likewise Comet Industries, Inc., a division of Hoffco, Inc., 25 Washington Avenue, Richmond, Ind. likewise supplies a number of highly suitable centrifugal clutches, designated variously as the S350 Series of Automatic Centrifugal Clutches, the 400 X-L Smooth Action Extra Life Clutch, and the Series NT-350 Double Sprocket Clutch. These and other suitable clutches can thus be purchased without difficulty from a number of sources.

It will thus be seen that in the embodiment described above, when hand lever 63 is not manually actuated, the force of spring 39 keeps stationary belt 31 tight against pulley 29 and keeps cable 103 in a position wherein the engine speed regulating sub-assembly of FIG. 3 causes the engine to operate in a preselected low speed range. This in turn prevents centrifugal clutch 91 from becoming engaged. When and during the time the operator depresses hand lever 63, cable 101 pulls lever member 93 into the position shown by phantom lines in FIG. 1 wherein stationary belt 31 is loosened from pulley 29 so that pulley 29 and cutter blades 15 are free to rotate. Concurrently cable 103 is moved by arm 97 into a position wherein the speed regulating sub-assembly of FIG. 3 causes the engine to operate in a preselected high speed range. This in turn results in centrifugal clutch 91 becoming and remaining engaged so that cutter blades 15 are rotated. When the operator releases hand lever 63 the force of spring 39 quickly returns lever member 93 to its original position so that cable 103 is pulled into the position resulting in the engine being caused to resume its operation in the preselected low speed range so that the centrifugal clutch quickly becomes disengaged. Concurrently stationary belt 31 frictionally engages pulley 29 so that the rotation of cutter blades 15 is rapidly stopped.

Figure 5:
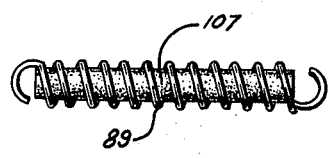
FIG. 5 is a view in perspective of a preferred governor spring of this invention damped against vibrational motion.

FIG. 5 illustrates another feature of the invention, namely an improved governor spring for use with the mower system discussed above. There is a tendency in some power mower equipment for the vibration of the engine during idle to cause the governor spring itself to undergo excessive vibration which can result in operational difficulties such as governor surge or drift whereby the engine speed may be increased enough for the centrifugal clutch to become engaged even while the stationary belt is in frictional engagement with the pulley. Likewise when the force applied by the lower portion of pivotal lever 105 is withdrawn there is a tendency for the governor spring 89 to contract rapidly causing a sudden surge of fuel into the engine. This in turn can cause the engine to stall. In accordance with this embodiment of the invention these problems of excessive vibration and excessively rapid contraction are effectively and easily overcome by fitting into the annular space defined by the coils of governor spring 89 a plug 107 made of a compressible elastomeric substance, most preferably a foamed rubber. The plug when properly fitted dampens the spring against excessive vibration and slows down the rate of its contraction enough to prevent a surge of incoming fuel to the engine.

Figure 6:
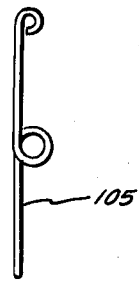
FIG. 6 is an especially preferred flexible spring link.

FIG. 6 depicts an especially preferred embodiment of this invention, namely a flexible spring link which is employed as pivotal lever 105. Such a spring link 105 is made from spring steel, for example 18 gauge spring steel, or any other suitably flexible and strong material. By using a flexible spring link in this manner the pull exerted by cable 103 causes the link to apply flex pressure against governor arm 81 while the arm is held thereby in the idle position. Under such conditions, undesired oscillation of cable 103 which may be caused by wear or stretch of stationary belt 31 will not allow governor spring 89 to pull governor arm 81 into a position where the engine would otherwise speed up enough for centrifugal clutch 91 to become engaged while stationary belt 31 is in frictional engagement with pulley 29.

It should be readily apparent that the safety systems of this invention are highly advantageous in that their cost is low and in that they can be readily adapted for use on a wide variety of commercially available power mowers of differing designs. And tests results have shown that a walk behind lawn mower equipped with the safety system of this invention complied with the requirements of the Consumer Products Safety Commission referred to at the outset.

It is thought that the invention and many of its attendant advantages will be understood from the foregoing description and it will be apparent that various changes may be made in the form, construction, and arrangement of the parts without departing from the spirit and scope of this invention, the forms hereinbefore described being merely preferred embodiments thereof.

I claim:

1. In a power mower operated by an operator who walks behind it, the mower having a wheeled body, a gasoline engine mounted on the body, a rotatable shaft driven by the engine, rotatable grass-cutting means adapted to be driven by power from said shaft, and an upstanding handle for grasping by the operator to guide the mowing, the improvement wherein said power mower further includes:

(a) a centrifugal cluth interposed between said drive shaft and said cutting means;

(b) a manually actuatable engine control associated with said handle and connected so that upon and during actuation the control enables the engine to be operated at a predetermined rate of speed at least high enough for the centrifugal clutch to engage, and upon termination of such actuation of the control, it causes the engine to operate at a predetermined rate of speed at least low enough for the centrifugal clutch to disengage; and (c) brake means including a V-groove drum that rotates with the grass-cutting means, as well as a V-belt sized to fit the V-groove but fixed so that it cannot rotate with the groove, said brake means being connected to the control and to the grass-cutting means to stop rotation of said cutting means concurrently with the disengagement of the centrifugal clutch when the control is not actuated, the engine control including a governor system comprising a pivotable governor arm linked to a carburetor throttle control and to a spring that urges said arm toward a position wherein the carburetor throttle control is at a setting causing the engine to operate in a preselected normal clutch-engaging operating speed range, and the engine control further including a push-pull actuator cable moveable in response to manual actuation and termination of manual actuation of said control by the operator, and a pivotal lever linked to said push-pull actuator cable and positioned so that (i) upon manual actuation of said engine control by the operator said cable causes said lever to release from said arm so that the force of said spring moves said arm to a position wherein the carburetor speed control is at a setting causing the engine to operate in a preselected normal operating speed range, and (ii) upon termination of manual actuation of said engine control by the operator said actuator cable causes said lever to apply a force upon said arm overriding the force of said spring and to force said arm against the urging of said spring to a position wherein it holds the carburetor speed control at a setting causing the engine to operate in a preselected low speed or idle range.

2. The apparatus of claim 1 further characterized in that said spring is a coil spring damped against excessive vibration and excessively rapid contraction by a compressible elastomer that engages the coils of the spring.

3. The apparatus of claim 2 wherein said elastomer is a foamed elastomer fitted within the coils of the spring.

4. A power mower operated by an operator who walks behind it, said mower having
 (a) a wheeled body;
 (b) a spark ignition internal combustion engine mounted on said body;
 (c) an upstanding handle for grasping by the operator to guide the mowing;
 (d) a manually actuatable control positioned on the upper portion of said handle;
 (e) a generally vertical rotary shaft driven by the engine;
 (f) a centrifugal clutch connected for operation by said rotary shaft;
 (g) rotary cutting blades secured to a V-grooved pulley at the output of said centrifugal clutch so that the blades are rotated with the rotary shaft when that shaft rotates at a sufficiently high speed;
 (h) a lever member pivotally secured to the underside of the wheeled body, said member extending from its point of rotation in at least two angularly displaced horizontal directions;
 (i) a governor system comprising a pivotal governor arm linked to a carburetor throttle control and to a governor spring that urges said arm toward a position wherein the carburetor throttle control is at a setting causing the engine to operate in a preselected normal speed range in which the centrifugal clutch is engaged and the cutting blades are driven;
 (j) a pivotal lever pivotally mounted intermediate its length in proximity to said pivotal governor arm so that a first end portion of said pivotal lever is adapted to move forwardly and backwardly in contact with said pivotal governor arm;
 (k) a first push-pull cable secured at one end to said lever member at a first locus removed from said point of rotation of said lever member and at its other end to the second end portion of said pivotal lever;
 (l) a second push-pull cable secured at one end to said manually actuatable control and at its other end to said lever member at a second locus which is (i) in proximity to said first locus and (ii) removed from said point of rotation of said lever member;
 (m) a brace secured to said lever member at a locus which is (i) angularly displaced from said first locus and said second locus, and (ii) removed from said point of rotation;
 (n) at least one V-belt tightly secured to said brace and positioned to be frictionally engaged with said pulley to stop rotation thereof, and alternatively to be loosened from said pulley so that the pulley is free to rotate; and
 (o) a coil spring attached at one end to the underside of said wheeled body and at its other end to said lever member, said coil spring normally tending to move said lever member to a first position wherein said brace frictionally engages said V-belt with said pulley and stops rotation thereof;
said mower being further characterized in that:
(1) upon and during actuation of said manually actuatable control said second push-pull cable rotates and holds said lever member in a second position wherein:
 (p) said brace loosens said V-belt from said pulley, and concurrently
 (q) said first push-pull cable pushes the second end portion of said pivotal lever to which it is secured thereby causing the first end portion of said pivotal lever to move backwardly relative to said pivotal governor arm so that said governor spring moves said arm to said first position whereby the engine operates in said preselected normal operating speed range in which the centrifugal clutch is engaged and the cutting blades are rotated; and
(2) upon termination of actuation of said control said coil spring moves said lever member to said first position wherein:
 (r) said first push-pull cable pulls the second end portion of said pivotal lever to which it is secured thereby forcing the first end portion of said pivotal lever to move forwardly relative to said pivotal governor arm so that said arm is forced to a second position wherein the carburetor throttle control is moved to a setting in which the engine is caused to operate in a preselected low speed or idle range in which the centrifugal clutch is disengaged; and concurrently
 (s) said brace engages said V-belt with said pulley and stops rotation of said pulley and the cutting blades.

* * * * *